United States Patent
Wang

(10) Patent No.: US 12,131,717 B2
(45) Date of Patent: Oct. 29, 2024

(54) COLOR-CHANGING DEVICE AND CONTROL METHOD THEREOF

(71) Applicant: SHENZHEN GUANGYI TECH CO., LTD., Shenzhen (CN)

(72) Inventor: Weishu Wang, Shenzhen (CN)

(73) Assignee: SHENZHEN GUANGYI TECH CO., LTD., Shenzhen (CN)

( * ) Notice: Subject to any disclaimer, the term of this patent is extended or adjusted under 35 U.S.C. 154(b) by 0 days.

(21) Appl. No.: 18/206,729

(22) Filed: Jun. 7, 2023

(65) Prior Publication Data

US 2023/0335077 A1    Oct. 19, 2023

Related U.S. Application Data

(63) Continuation of application No. PCT/CN2021/134004, filed on Nov. 29, 2021.

(30) Foreign Application Priority Data

Dec. 8, 2020 (CN) .......................... 202011443149.9

(51) Int. Cl.
  *G09G 3/38*     (2006.01)
  *G02F 1/1516*   (2019.01)
  *G02F 1/153*    (2006.01)

(52) U.S. Cl.
  CPC .............. *G09G 3/38* (2013.01); *G02F 1/1516* (2019.01); *G02F 1/1533* (2013.01);
  (Continued)

(58) Field of Classification Search
  None
  See application file for complete search history.

(56) References Cited

U.S. PATENT DOCUMENTS

| 10,386,688 | B1 | 8/2019 | Sharpe |
| 2013/0222877 | A1 | 8/2013 | Greer |

(Continued)

FOREIGN PATENT DOCUMENTS

| CN | 104246594 A | 12/2014 |
| CN | 104898345 A | 9/2015 |

(Continued)

OTHER PUBLICATIONS

Chinese Office Action for corresponding application 202011443149; Report dated May 18, 2022.

(Continued)

*Primary Examiner* — Nicholas J Lee
(74) *Attorney, Agent, or Firm* — CANTOR COLBURN LLP

(57) ABSTRACT

A color-changing device and a control method thereof. The color-changing device comprises a first substrate layer, a first conductive layer, a color-changing layer, a second conductive layer, and a second substrate layer that are stacked in sequence. Edges of two ends of the first conductive layer are respectively provided with a first bus bar (1) and a second bus bar (2), and a third bus bar (3) and a fourth bus bar (4) are respectively provided at edges of two ends of the second conductive layer. The color-changing device also comprises at least one partition structure, comprising at least two boundary bus bars and at least one partition bus bar located between the two boundary bus bars, the partition bus bar and the boundary bus bars being respectively located on different conductive layers. The control method is used for controlling the transmittance state of the color-changing device; a color-changing control signal is applied to the color-changing device; a target voltage is determined according to a transmission rate state type carried by the color-changing control signal received by the color-chang- (Continued)

ing device; the target voltage at least comprises voltage values corresponding to the first bus bar (1), the second bus bar (2), the third bus bar (3), the fourth bus bar (4), the boundary bus bar, and the partition bus bar, respectively; and the transmittance state of the color-changing device is adjusted according to the target voltage. A voltage abrupt change is realized at the partition structure composed of the boundary bus bar and partition bus bar, thereby achieving the partition color change of the color-changing device.

20 Claims, 4 Drawing Sheets

(52) U.S. Cl.
CPC ............... *G09G 2310/0248* (2013.01); *G09G 2320/0626* (2013.01); *G09G 2320/0666* (2013.01)

(56) References Cited

U.S. PATENT DOCUMENTS

| | | | |
|---|---|---|---|
| 2018/0196323 A1* | 7/2018 | Wang | G02F 1/155 |
| 2018/0259822 A1 | 9/2018 | Dixit | |
| 2020/0041857 A1* | 2/2020 | Wang | E06B 9/24 |
| 2020/0209698 A1 | 7/2020 | Wang | |
| 2020/0272015 A1 | 8/2020 | Wang | |

FOREIGN PATENT DOCUMENTS

| | | |
|---|---|---|
| CN | 105164581 A | 12/2015 |
| CN | 105324708 A | 2/2016 |
| CN | 105496686 A | 4/2016 |
| CN | 108646495 A | 10/2018 |
| CN | 108646497 A | 10/2018 |
| CN | 102460292 A | 11/2018 |
| CN | 108761952 A | 11/2018 |
| CN | 110088676 A | 8/2019 |
| CN | 110196523 A | 9/2019 |
| CN | 110873989 A | 3/2020 |
| CN | 110908208 A | 3/2020 |
| CN | 11255837 A | 3/2021 |
| CN | 112558371 A | 3/2021 |

OTHER PUBLICATIONS

Christopher J. Barile, "Dynamic Windows with Neutral Color, High Contrast, and Excellent Durability Using Reversible Metal Electrodeposition", Joule 1, 1-13, Sep. 6, 2017.

International Search Report for corresponding application PCT/CN2021/134004 filed Nov. 29, 2021; Mail date Feb. 28, 2022.

* cited by examiner

COLOR-CHANGING DEVICE AND CONTROL METHOD THEREOF

CROSS-REFERENCE TO RELATED APPLICATION(S)

This is a continuation application of International Patent Application NO. PCT/CN2021/134004, filed on Nov. 29, 2021, which is based on and claims priority to Chinese Patent Application No. 2020114431499 filed on Dec. 8, 2020, the disclosures of which are incorporated herein by reference in their entireties.

TECHNICAL FIELD

The present application belongs to the technical field of electrochromism, and relates to a color-changing device and a control method thereof.

BACKGROUND

Electrochromic products have an emphasis on how to control the partition color change (that is, the case where different regions have inconsistent transmittance) of the electrochromic device. Generally, the control of different regions is realized by separating the conductive layers of different regions. However, in the prior art, once the conductive layers are separated, the regions of partition color change will be fixed and cannot be adjusted according to the needs of practical applications.

Besides, the electrochromic device can further adjust the light intensity by adjusting the transmittance of the device. Usually, the whole electrochromic device is in one specific transmittance state, that is, each point on the device has the same transmittance, and a gradual state cannot be achieved.

Generally, by applying different voltages at specific positions on the bus bar, the overall potential distribution of the electrochromic device is controlled, and the gradual effect is further achieved, in which the color change has a direction from the two ends of the bus bar to the middle. However, under this circumstance, the device will have uneven color change visually, and take a long time to change the color. Meanwhile, the current loss is also large when different voltages are directly applied on the same bus bar, and the excessive current loss will be converted into heat energy, thereby accelerating the damage of the electrochromic device, especially the device damage at the bus bar.

CN108761952A discloses a color-changing dimmable glass that can display patterns in different regions. A first bus bar and a second bus bar are arranged through the second conductive layer and the EC stack layer, the second conductive layer is provided with a third bus bar at the side far away from the first bus bar, the second conductive layer is provided with at least two fourth bus bars at the side far away from the second bus bar, the second conductive layer is insulation-partitioned by a laser-etched groove to form at least two pattern regions, and the pattern regions are connected to the fourth bus bars by a connecting region: the second conductive layer and the EC stack layer are provided with a first laser-etched groove for insulation-partitioning the first bus bar and the third bus bar, and a second laser-etched groove for insulation-partitioning the second bus bar and the fourth bus bar. The problem of this document is that when the conductive layer is separated by the laser-etched groove, the color-changing region is fixed and cannot be adjusted according to the needs of practical applications.

CN105324708A discloses a bus bar configuration and a fabrication method of non-rectangular shaped (for example, triangular, trapezoidal, circular, pentagonal, hexagonal, arched, etc.) optical device. The optical device includes a first side, a second side, and a third side adjacent to the second side, and two bus bars spanning a portion of the optical device. The optical transition in this document is typically driven by applying an appropriate electric potential across the two thin conductive layers of the optically switchable device. In this way, the current loss is large when different voltages are directly applied on the same bus bar, and the excessive current loss will be converted into heat energy, thereby accelerating the damage of the electrochromic device, especially the device damage at the bus bar.

Therefore, it has been an urgent technical problem to be solved how to realize the region adjustment of partition color change as well as the combined effect of partition and gradual transition.

SUMMARY

An object of the present application is to provide a color-changing device and a control method thereof. In the present application, by arranging a partition structure including a partition bus bar and a boundary bus bar on the conductive layer of the color-changing device, and by controlling the voltage on the bus bar, the region of the partition color change of the color-changing device is adjusted based on the practical application, and at the same time, the combined effect of gradual transition and partition can also be achieved, and the damage of the device is reduced which is caused by the current loss.

In order to achieve objects of the present application, the present application adopts the technical solutions below:

In a first aspect, the present application provides a color-changing device, and the color-changing device includes a first substrate layer, a first conductive layer, a color-changing layer, a second conductive layer and a second substrate layer that are stacked in sequence; wherein the first conductive layer is provided with a first bus bar and a second bus bar respectively at edges of two ends;

the second conductive layer is provided with a third bus bar and a fourth bus bar respectively at edges of two ends; and the color-changing device includes at least one partition structure, wherein the partition structure includes at least two boundary bus bars and at least one partition bus bar located between the two boundary bus bars, and the partition bus bar and the boundary bus bar are respectively located on different conductive layers.

In the present application, by arranging the partition structure including the partition bus bar and the boundary bus bar on the conductive layer of the color-changing device, and by controlling the voltage on the bus bar, a voltage abrupt change can be realized at the partition structure, and thus, the region of the partition color change of the color-changing device can be adjusted based on the practical application with no need to separate the conductive layer, and meanwhile, the combined effect of gradual transition and partition can also be achieved, and the damage of the device is reduced which is caused by the current loss.

In the present application, a shape of the bus bar is not particularly limited, which can be a linear shape or a curved shape, and is determined based on a shape of the color-changing device.

It should be noted that materials of the conductive layer, the substrate layer and the bus bar are not specifically required and particularly limited in the present application. Those skilled in the art can rationally select the materials of the conductive layer, the substrate layer and the bus bar based on the actual needs. For example, the substrate layer can be a transparent substrate and has an optical grade transparent material, specifically a flexible substrate material, including a polyester film (Polyester Film), a cyclic olefin copolymer or cellulose triacetate, etc.

a conductive material of the conductive layer can be selected from indium-tin oxide (indium-tin oxide, ITO), aluminum zinc oxide (aluminum zinc oxide, AZO), fluorine doped tin oxide (fluorine doped tin oxide, FTO), silver nanowires, graphene, carbon nanotubes, metal mesh or silver nanoparticles and so on:

a conductive material of the bus bar can be selected from any one or a combination of at least two of conductive silver paste, conductive copper paste, conductive carbon paste, nanosilver conductive ink, copper foil, copper wire or conductive film and so on: the material can also be the same material of the conductive layer, and the material of the bus bar has larger thickness and smaller resistance, which thereby guarantees the conductive function and also increases the visual consistency of the product at the same time in view of the fact that the material is inherently transparent.

Meanwhile, the positional relationship of the bus bar to the conductive layer and the substrate layer may be arbitrary: the bus bar must be in contact with the conductive layer, but it can be arranged at any position relative to the substrate layer.

Optionally, the partition structure has a width of less than 5 cm, such as 4.9 cm, 4.7 cm, 4.5 cm, 4.3 cm, 4 cm, 3.5 cm or 3 cm, etc.

The width of the partition structure in the present application specifically refers to the maximum distance between two boundary bus bars in the partition structure.

If the width of the partition structure is too large, the position where the partition structure is arranged will exhibit inconsistent color change compared with the entire device, because a voltage abrupt change occurs at the partition structure.

Optionally, a surface resistance of the conductive layer inside the partition structure is greater than the surface resistance of the conductive layer outside the partition structure, wherein "inside the partition structure" refers to the region between two boundary bus bars of the partition structure. By increasing the surface resistance of the conductive layer inside the partition structure, even when the voltage difference between the boundary bus bars at two ends of the partition structure is large, local heat generation in the partition structure can be reduced. Specifically, the conductive layer inside the partition structure can be streaked, etched etc. to increase the local surface resistance of the conductive layer inside the partition structure.

Optionally, the first bus bar, the second bus bar, the third bus bar, the fourth bus bar, the partition bus bar and the boundary bus bar are parallel to each other.

The bus bars are parallel to each other, which is beneficial to improve the color-changing uniformity of the color-changing device.

Optionally, the first conductive layer and the second conductive layer are both provided with an anchor hole.

The anchor hole facilitates precisely aligning the first conductive layer and the second conductive layer when they are arranged together.

The anchor hole is used to fix the position of the conductive layer, and should avoid to locate in the color-changing region in case the operation of the color-changing device is affected. The position and number of the anchor hole can be determined rationally based on the installation requirements. For example, the anchor holes are located at two ends of the conductive layer. Optionally, the projection of the first bus bar coincides with the projection of the third bus bar on the plane of the color-changing device, and/or the projection of the second bus bar coincides with the projection of the fourth bus bar on the plane of the color-changing device.

Since the color/transmittance of the region where the bus bar is arranged may be different from the color/transmittance of the region where no bus bar is arranged, and for example, the region where the bus bar is arranged has an inherent color of the bus bar, while the region where no bus bar is arranged has changeable transmittance according to the voltage, the overall visual consistency of the color-changing device can be improved as much as possible by arranging the two opposite bus bars to overlap each other.

Optionally, the first bus bar, the second bus bar, the third bus bar, the fourth bus bar, the partition bus bar and the boundary bus bar independently have a thicknesses of 10 nm-5 µm, such as 10 nm, 50 nm, 100 nm, 200 nm, 500 nm, 800 nm, 1 µm, 2 µm, 3 µm, 3.5 µm, 4 µm, 4.5 µm or 5 µm, etc.

Optionally, the first bus bar, the second bus bar, the third bus bar, the fourth bus bar, the partition bus bar and the boundary bus bar independently have a width of less than 20 mm, such as 19.5 mm, 19 mm, 18 mm, 15 mm, 13 mm, 10 mm, 8 mm, 5 mm, 1 mm, 0.5 mm, 0.4 mm or 0.3 mm, etc., and optionally less than 2 mm.

The width of the bus bar should not be too wide, because the excessively width will cause the bus bar to be too obtrusive in visual effect and reduce the overall aesthetics of the device. When the width of the bus bar is more than 5 mm, a shielding layer can be further arranged at the corresponding region of the bus bar to shield the bus bar.

Optionally, the first bus bar, the second bus bar, the third bus bar, the fourth bus bar, the partition bus bar and the boundary bus bar all have electrical conductivity more than that of the first conductive layer and the second conductive layer.

The electrical conductivity of the bus bar material is greater than that of the conductive layer material, which is beneficial to reduce the voltage drop along the bus bar (namely, the lateral direction of the color-changing device), thereby increasing the voltage uniformity at each point along the lateral direction of the color-changing device, increasing the color-changing uniformity of the color-changing device, and speeding up the color-changing speed.

Optionally, at least one end of the first bus bar, the second bus bar, the third bus bar, the fourth bus bar, the partition bus bar and the boundary bus bar are provided with a lead-out structure.

The lead-out structure is used to connect an external power source. By arranging the lead-out structure on the bus bar, since the bus bar is usually made of a material with high electrical conductivity, the color-changing response speed of the color-changing device can be improved.

Optionally, the first bus bar, the second bus bar, the third bus bar, the fourth bus bar, the partition bus bar and the boundary bus bar are provided with the lead-out structures at two ends.

The bus bar is provided with the lead-out structures at two ends, that is, two electrodes are led out from one bus bar, which can avoid uneven potential distribution caused by the voltage drop of the bus bar when the voltage is only applied on one end, thereby affecting the color-changing effect.

Optionally, the first bus bar, the second bus bar, the third bus bar, the fourth bus bar, the partition bus bar and the boundary bus bar are provided with anchor holes at two ends.

The anchor hole facilitates precisely aligning the first conductive layer and the second conductive layer when they are stacked in sequence.

Optionally, the lead-out structures of the first bus bar, the second bus bar, the third bus bar, the fourth bus bar, the partition bus bar and the boundary bus bar are staggered.

In order to avoid the lead-out structures of two bus bars at the same position overlapping each other and causing the problem of inconvenient lead-out and easy short-circuiting when the first conductive layer and the second conductive layer are opposite each other, the lead-out structures are designed to be staggered from each other.

Optionally, the first bus bar, the second bus bar, the third bus bar, the fourth bus bar, the partition bus bar and the boundary bus bar are not in contact with each other.

Optionally, the first bus bar, the second bus bar, the third bus bar, the fourth bus bar, the partition bus bar and the boundary bus bar are independently provided with a protective layer and/or an insulating layer.

The protective layer and/or the insulating layer can be an insulating rubber layer, insulating varnish, etc.

By arranging a protective layer on the bus bar, the bus bar material can be protected from being corroded or oxidized by environmental factors such as water vapor, oxygen and so on. By arranging an insulating layer on the bus bar, the bus bar on the first conductive layer can be protected from contacting with the second conductive layer or the bus bar on the second conductive layer, or the bus bar on the second conductive layer can be protected from contacting with the first conductive layer or the bus bar on the first conductive layer. Therefore, it is beneficial to improve the stability and service life of the color-changing device.

In a second aspect, the present application also provides a control method for a color-changing device, which is used to control a transmittance state of the color-changing device in the first aspect.

Applying a color-changing control signal to the color-changing device, and determining target voltage based on a transmittance state type carried by the color-changing control signal received by the color-changing device, in which the target voltage at least includes the respectively corresponding voltage values of the first bus bar, the second bus bar, the third bus bar, the fourth bus bar, the boundary bus bar and the partition bus bar;

and adjusting the transmittance state of the color-changing device with the target voltage.

By applying different voltages on the bus bars, a voltage abrupt change can be effectively realized at the partition structure including the boundary bus bar and the partition bus bar. By applying voltages on the bus bars, it is realized that different regions of the color-changing device have different voltages, and at the same time, by combining the voltage abrupt change at the partition structure, partition color change of the color-changing device can be achieved. Meanwhile, the effect of gradual transition or the combined effect of partition and gradual transition can be achieved by adjusting the voltage.

Exemplarily, a preparation method of the above color-changing device is provided, and the preparation method specifically includes the following steps:

(1) manufacturing a conductive layer on a substrate: the conductive layer is manufactured on a substrate by magnetron sputtering (or vacuum evaporation deposition, sol-gel, chemical vapor deposition, etc.), and thereby the first conductive layer and the second conductive layer are respectively manufactured.

(2) manufacturing a bus bar and a partition structure on the first conductive layer and the second conductive layer respectively: the bus bar and the partition structure are respectively manufactured on the preset positions of the first conductive layer and the second conductive layer by screen printing silver paste.

(3) coating an electrochromic layer on the first conductive layer: 500 mg of poly(3-hexylthiophene) (P3HT) is dissolved in 10 mL of o-xylene, and stirred magnetically for 10 h, and then the resulting solution is dropped onto the ITO layer (the first conductive layer) plated on the first substrate layer, and spin-coated to form an electrochromic layer.

(4) coating an ion storage layer on the second conductive layer: 500 mg of tungsten trioxide is dissolved in 20 mL of deionized water, stirred and filtered, and then the resulting solution is dropped onto the ITO layer (the second conductive layer) plated on the second substrate layer, and spin-coated to form a tungsten trioxide coating and obtain an ion storage layer.

(5) preparing the whole color-changing device: 20% by mass of lithium perchlorate, 59.9% by mass of methyl methacrylate, 20% of propylene carbonate and 0.1% by mass of azobisisobutyronitrile are mixed, coated on the ion storage layer to form an ion transfer layer; then the above electrochromic material layer (together with the first substrate layer) is covered on the ion transfer layer, and UV-cured to form the ion transfer layer.

Compared with the prior art, the present application has the beneficial effects below:

(1) In the present application, by applying different voltages on different bus bars, the effect of rapid color change and uniform color change can be achieved while gradual color change is realized, and meanwhile, the current loss can also be reduced, effectively avoiding the damage of the device.

(2) In the present application, by applying different voltages on the boundary bus bar and the partition bus bar, a voltage abrupt change can be realized at the partition structure including them, and thus the voltages in different regions of the color-changing device can be different, and at the same time, with the voltage abrupt change at the partition structure, partition color change of the color-changing device can be achieved.

(3) By applying different voltages on the bus bars, a voltage abrupt change can be effectively realized at the partition structure including the boundary bus bar and the partition bus bar. By applying voltages on the bus bars, it can be realized that different regions of the color-changing device have different voltages, and at the same time, by combining the voltage abrupt change at the partition structure, partition color change of the color-changing device can be achieved. Meanwhile, the combined effect of partition and gradual transition can also be achieved by adjusting the voltage.

Figure 1:
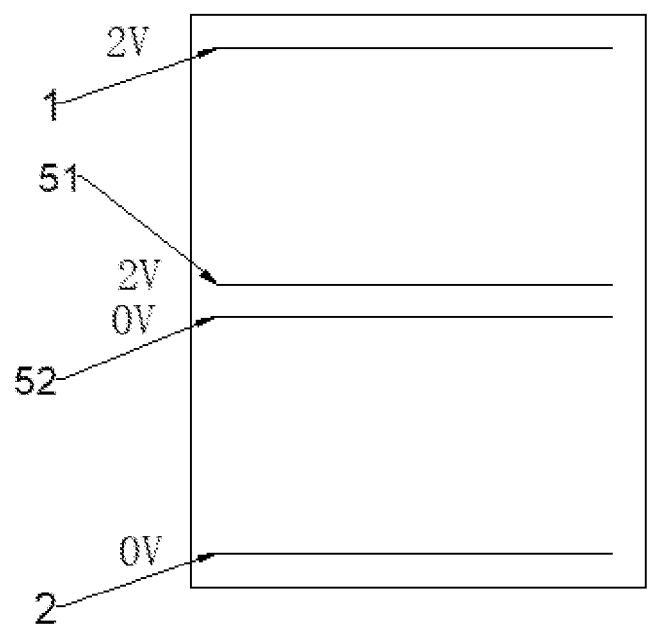
FIG. 1 shows the distribution of all bus bars on a first conductive layer and the distribution of voltage applied to bus bars in Embodiment 1.

1—first bus bar, 2—second bus bar, 3—third bus bar, 4—fourth bus bar, 51—first boundary bus bar, 52—second boundary bus bar, 53—third boundary bus bar, 54—the fourth boundary bus bar, 61—first partition bus bar, 62—second partition bus bar, 7—first partition structure, 8—second partition structure, 9—third partition structure, 11—lead-out structure on a first conductive layer, 12—anchor hole in a first conductive layer, 21—lead-out structure on a second conductive layer, 22—anchor hole in a second conductive layer.

DETAILED DESCRIPTION

Technical solutions of the present application are further described below through embodiments. It should be apparent to those skilled in the art that the embodiments are only for a better understanding of the present application, and should not be regarded as a specific limitation of the present application.

It should be understood that in the description of the present application, the terms "center", "lengthways", "crosswise", "above", "below", "front", "back", "left", "right", "vertical", "horizontal", "top", "bottom", "inner", "outer" and the like indicate an orientation or a positional relationship based on an orientation or a positional relationship shown in accompanying drawings, which is only used for describing the present application conveniently and simplifying the description, rather than indicating or implying that the device or unit referred to necessarily has a particular orientation or needs to be arranged and operated in a particular orientation, and thereby should not be construed as a limitation to the present application. In addition, the terms "first", "second" and the like are only used for descriptive purposes, and should not be construed as indicating or implying relative importance, or indicating or implying a number of the technical feature referred to. Hence, a feature defined as "first", "second" or the like may expressly or implicitly include one or more of the features. In the description of the present disclosure, unless otherwise specified, "a plurality of" refers to two or more than two.

It should be noted that, in the description of the present application, unless otherwise specified or defined particularly, the terms "provide", "link" and "connect" should be understood in a broad sense: for example, there may be a fixed connection, a detachable connection, or an integral connection: there may be a mechanical connection or an electrical connection; and there may be a direct connection, an indirect connection through an intermediate medium, or an internal communication between two units. For those skilled in the art, specific meanings of the above terms in the present application can be understood through specific situations.

Embodiment 1

This embodiment provides a color-changing device. The color-changing device can realize the effect of partition color change as well as the effect of gradual color change.

The color-changing device includes a first substrate layer, a first conductive layer, a color-changing layer, a second conductive layer and a second substrate layer that are stacked in sequence.

The color-changing layer includes an ion storage layer, an ion transfer layer and an electrochromic layer that are stacked in sequence, and the electrochromic layer is stacked to the first conductive layer.

Figure 4:
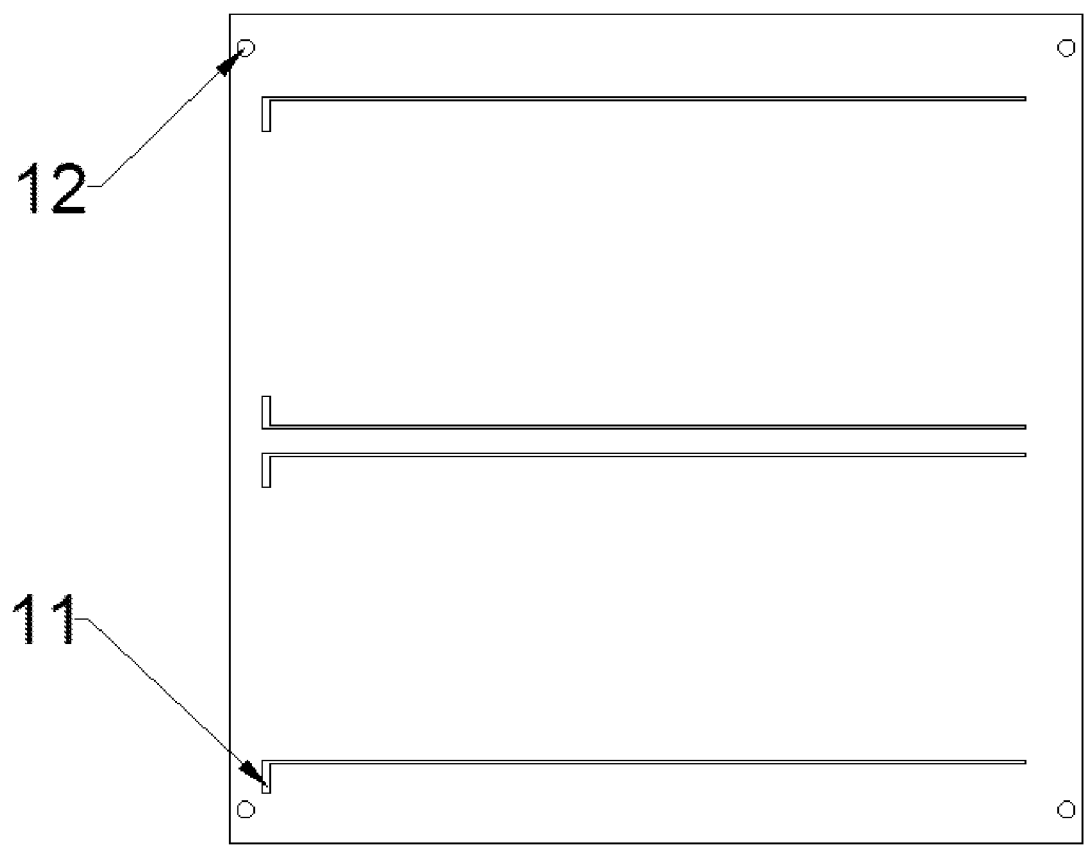
FIG. 4 shows the distribution of a lead structure and an anchor hole structure on a first conductive layer in Embodiment 1.
Figure 5:
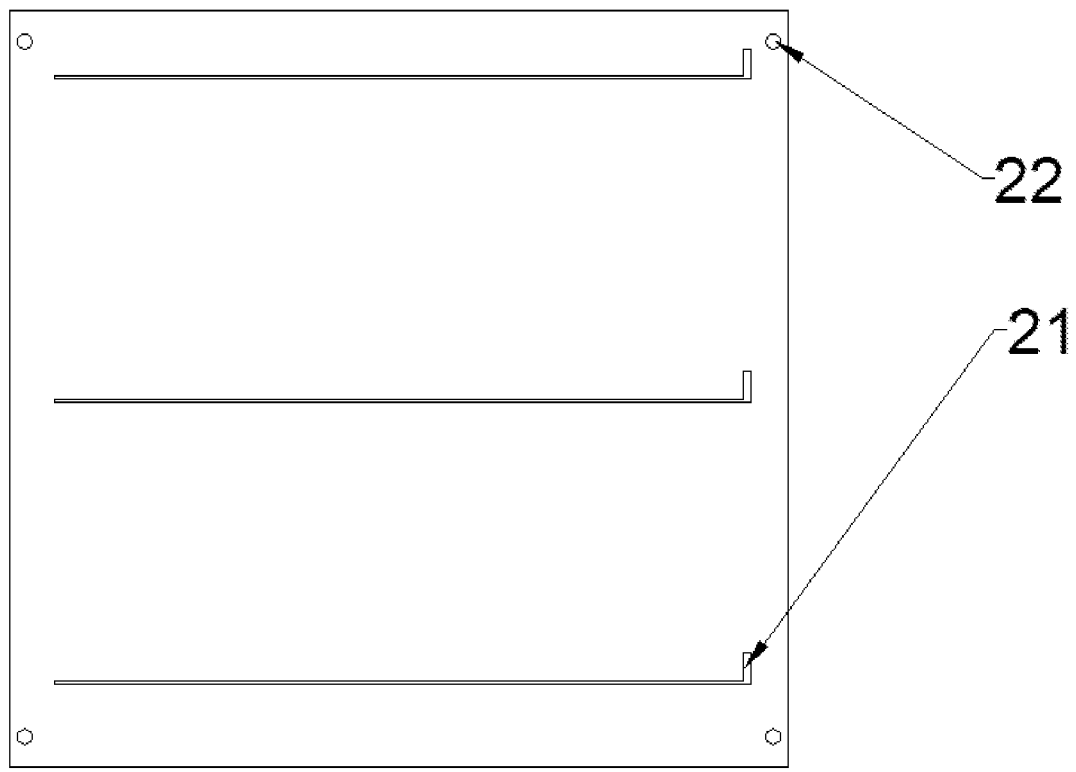
FIG. 5 shows the distribution of a lead structure and an anchor hole structure on a second conductive layer in Embodiment 1.

As shown in FIG. 4, the first conductive layer is provided with anchor holes 12 at two ends: as shown in FIG. 5, the second conductive layer is provided with anchor holes 22 at two ends.

As shown in FIG. 1, the first conductive layer is provided with a first bus bar 1 and a second bus bar 2 respectively at edges of two ends.

Figure 2:
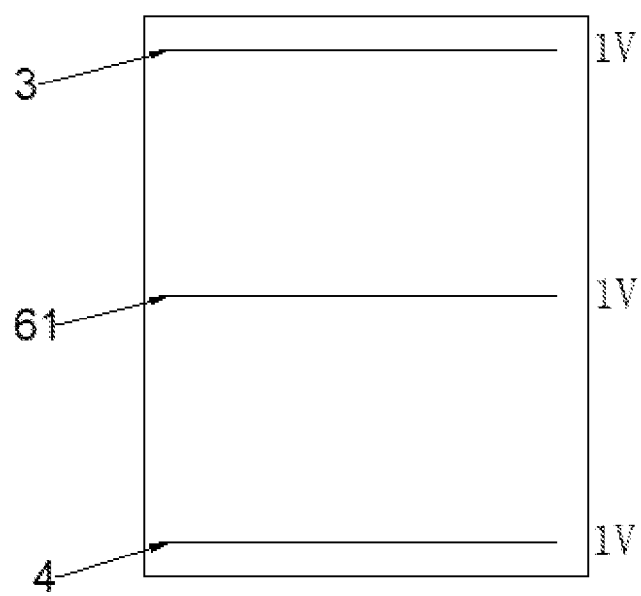
FIG. 2 shows the distribution of all bus bars on a second conductive layer and the distribution of voltage applied to bus bars in Embodiment 1.

As shown in FIG. 2, the second conductive layer is provided with a third bus bar 3 and a fourth bus bar 4 respectively at edges of two ends.

Figure 3:
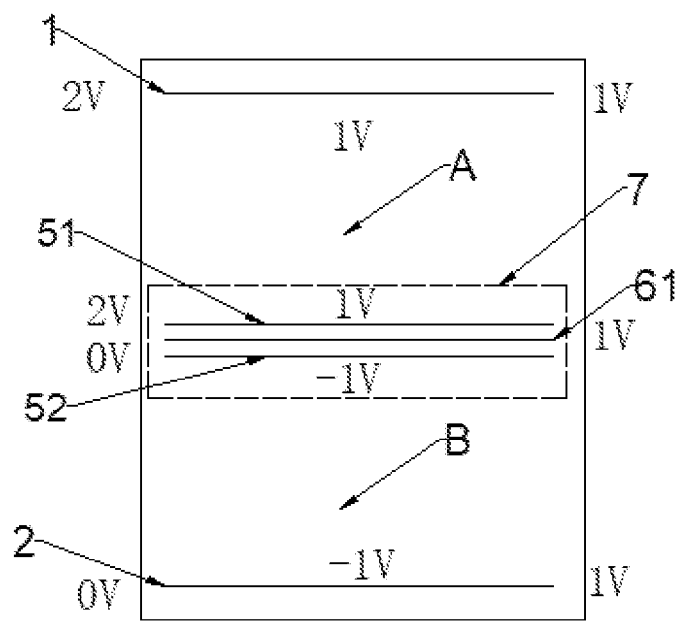
FIG. 3 shows the distribution of the plane projections from all bus bars on a first conductive layer and a second conductive layer and the distribution of voltage applied to bus bars, and also shows two partitioned color-changing regions A and B in Embodiment 1.

As shown in FIGS. 1-3, the color-changing device includes a first partition structure 7, and the first partition structure 7 includes a first boundary bus bar 51 and a second boundary bus bar 52 that are located on the first conductive layer, and a first partition bus bar 61 that is located on the second conductive layer. The first partition bus bar 61 is located between the first boundary bus bar 51 and the second boundary bus bar 52. Two different regions are separated out by the first partition structure 7.

The projection of the first bus bar 1 coincides with the projection of the third bus bar 3 on the plane of the color-changing device, and the projection of the second bus bar 2 coincides with the projection of the fourth bus bar 4 on the plane of the color-changing device.

Each bus bar of the color-changing device is provided with a lead-out structure at one end, and the projections of the lead-out structures 11 on the first conductive layer and the lead-out structures 21 on the second conductive layer are staggered on the plane. At the same time, bus bars are not in contact with each other.

In the color-changing device, the first partition structure 7 has a width of 2 cm, and the bus bar has a width of 0.5 mm and a thickness of 3 μm.

As shown in FIG. 3, the figure shows the distribution of the plane projections from all the bus bars on the first conductive layer and the second conductive layer and the distribution of voltage applied to the bus bars in this embodiment. As shown in the figure, the plane projections only show the first bus bar 1 and the second bus bar 2, because the projection of the first bus bar 1 coincides with the projection of the third bus bar 3 on the plane of the color-changing device, and the projection of the second bus bar 2 coincides with the projection of the fourth bus bar 4 on the plane of the color-changing device. The first partition structure 7 includes the first boundary bus bar 51, the second boundary bus bar 52, and the first partition bus bar 61, and additionally, the projection of the first partition bus bar 61 on the plane is located between the projections of the first boundary bus bar 51 and the second boundary bus bar 52 on the plane. Two regions, A and B, are separated out by the first partition structure 7. By adjusting the voltage on the bus bars, different regions are allowed to have different transmittance, thereby realizing the color-changing effect of partition color change and gradual color change.

Figure 6:
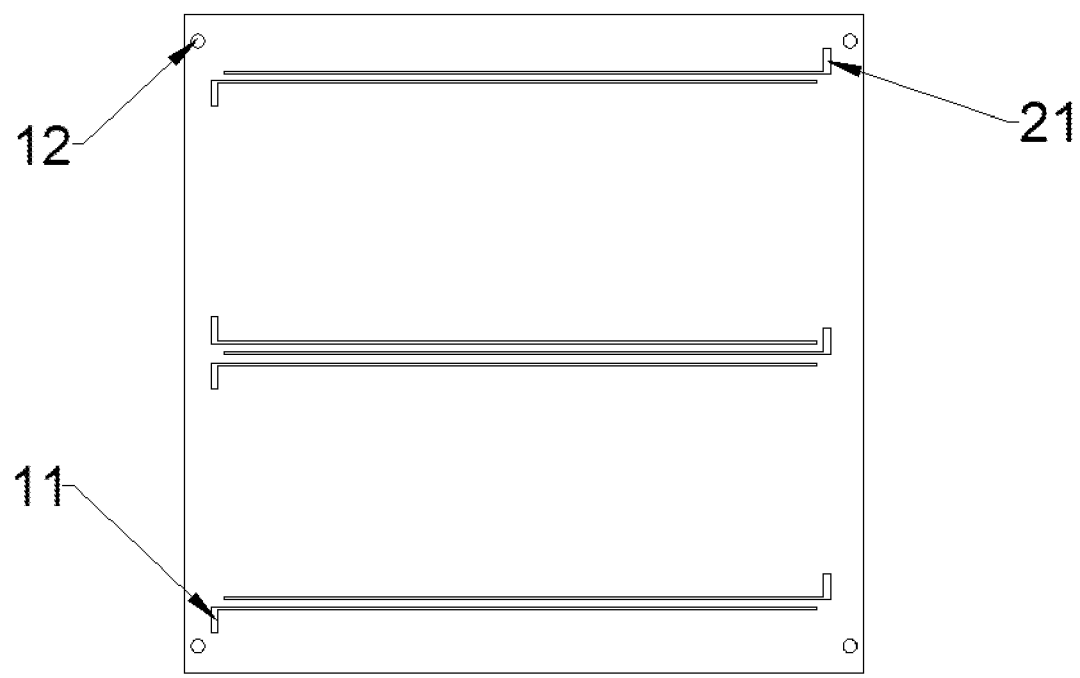
FIG. 6 shows the distribution of the plane projections from all lead structures and anchor holes on a first conductive layer and a second conductive layer in Embodiment 1.

As shown in FIG. 6, it can be seen that the lead-out structure 11 arranged at one end of the bus bar on the first conductive layer and the lead-out structure 21 arranged at one end of the bus bar on the second conductive layer are arranged in a staggered form without contact with each other, and the first conductive layer and the second conductive layer can be aligned precisely based on the anchor hole 12 and anchor hole 22.

Embodiment 2

This embodiment provides a control method for a color-changing device, and the control method can be performed by a controller that controls the transmittance of the color-changing device. Specifically, the method includes the following steps:

S1. A color-changing control signal is applied to the color-changing device, and target voltage is determined based on a transmittance state type carried by the color-changing control signal received by the color-changing device, in which the target voltage at least includes the respectively corresponding voltage values of a first bus bar, a second bus bar, a third bus bar, a fourth bus bar, a boundary bus bar and a partition bus bar:

S2. The transmittance state of the color-changing device is adjusted with the target voltage.

In the step S1, the color-changing control signal may be applied by the user discretionarily, or may be triggered by specific condition (such as temperature, illumination, etc.). The color-changing control signal at least carries a transmittance state type, and specifically, the transmittance state type includes partition color change, gradual color change, other type preset by the user, and the like. The color-changing control signal can be, for example, [partition color change], [gradual color change], and the like.

Furthermore, the color-changing control signal can also carry location information of the color-changing region and a transmittance state corresponding to each location. Specifically, the color-changing device can be divided into a plurality of regions, and each region has its corresponding code. For example, for the color-changing device of Embodiment 1, the color-changing device can be divided into region A located above the first partition structure 7 and region B located below the first partition structure 7. The color-changing control signal can be, for example, [partition color change: region A, bleached state: region B, colored state], [gradual color change: region A, colored state: region B, gradual-transition state from colored state to bleached state], and the like.

A target voltage list corresponding to different transmittance state types is pre-stored in the controller/processor of the color-changing device. When the transmittance state type of the color-changing device is determined, the voltage value corresponding to each bus bar can be determined based on the target voltage list. Then, the corresponding voltage is applied to each bus bar respectively, so that the transmittance state of the color-changing device can be adjusted to the desired state.

Taking the color-changing device of Embodiment 1 as an embodiment, an implementation process of the control method is specifically described below.

Exemplarily, target voltage list 1 is as follows:

TABLE 1

| Bus bar | Voltage code | Partition color change | Gradual color change |
|---|---|---|---|
| First bus bar 1 | U1 | 2 V | 1 V |
| Second bus bar 2 | U2 | 0 V | 2 V |
| First boundary bus bar 51 | U5 | 2 V | 1 V |
| Second boundary bus bar 52 | U6 | 0 V | 1 V |
| Third bus bar 3 | U3 | 1 V | 2 V |
| Fourth bus bar 4 | U4 | 1 V | 1 V |
| First partition bus bar 61 | U7 | 1 V | 2 V |

The following description may explain how the partition color change is implemented.

For region A, U1−U3=U5−U7=1 V: for region B, U2−U4=U6−U7=−1 V: the color-changing effect is realized, in which region A has a bleached state and region B has a colored state.

For the color-changing device of Embodiment 1, region A has a voltage difference of 1 V between the two conductive layers, and then the material of the color-changing layer will be bleached under this voltage, and the transmittance becomes higher (for example, the transmittance is increased to 60%), so that region A is visually transparent and colorless: region B has a voltage difference of −1 V between the two conductive layers, and then the material of the color-changing layer will be colored under this voltage, and the transmittance becomes lower (for example, the transmittance is reduced to 5%), so that region B is visually dark and opaque. The following description may explain how the gradual color change is implemented.

For region A, U1−U3=U5−U7=−1 V: for region B, U6−U7=−1 V, U2−U4=1 V; the color-changing effect is realized, in which region A has a colored state and region B has a gradual-transition state from colored state to bleached state.

For the color-changing device of Embodiment 1, region A has a voltage difference of −1 V between the two conductive layers, and then the material of the color-changing layer will be colored under this voltage, and the transmittance becomes lower (for example, the transmittance is reduced to 5%), so that region A is visually dark and opaque: region B has a gradual-transition voltage difference from −1 V to 1 V between the two conductive layers, and the material of the color-changing layer will be bleached under the voltage difference of 1 V, and the transmittance becomes higher (for example, the transmittance is increased to 60%), showing the transparent and colorless appearance visually: therefore, in the case where region B has the gradual-transition voltage difference from −1 V to 1 V between the two conductive layers, region B shows the gradual color-changing effect from colored state to bleached state visually.

It can be understood that, when the whole device is expected to exhibit one certain state, such as bleached state, the effect can be realized by applying voltage at the two ends of the device (for example, voltage is applied to the first bus bar 1 and the fourth bus bar 4 to allow those two to have a voltage difference of 1 V): additionally, in the case where the whole device is expected to exhibit gradual color change, for example, the color-changing effect of the whole device from top to bottom transitioning from colored state to bleached state, the effect can be realized by applying voltage at the two ends of the device (for example, allowing U1−U3=−1 V, U2−U4=1 V).

It can be understood that the specific voltage values in this embodiment are specific embodiments given for the convenience of explaining the present application, and have no specific limitation on the voltage of each bus bar. Those shilled in the art can modify the voltage based on the invention conception of the present application.

Embodiment 3

This embodiment provides a color-changing device that can realize partition color change and gradual color change at the same time.

The color-changing device includes a first substrate layer, a first conductive layer, a color-changing layer, a second conductive layer and a second substrate layer that are stacked in sequence.

The first conductive layer is provided with a first bus bar 1 and a second bus bar 2 respectively at edges of two ends.

The second conductive layer is provided with a third bus bar 3 and a fourth bus bar 4 respectively at edges of two ends.

Figure 7:
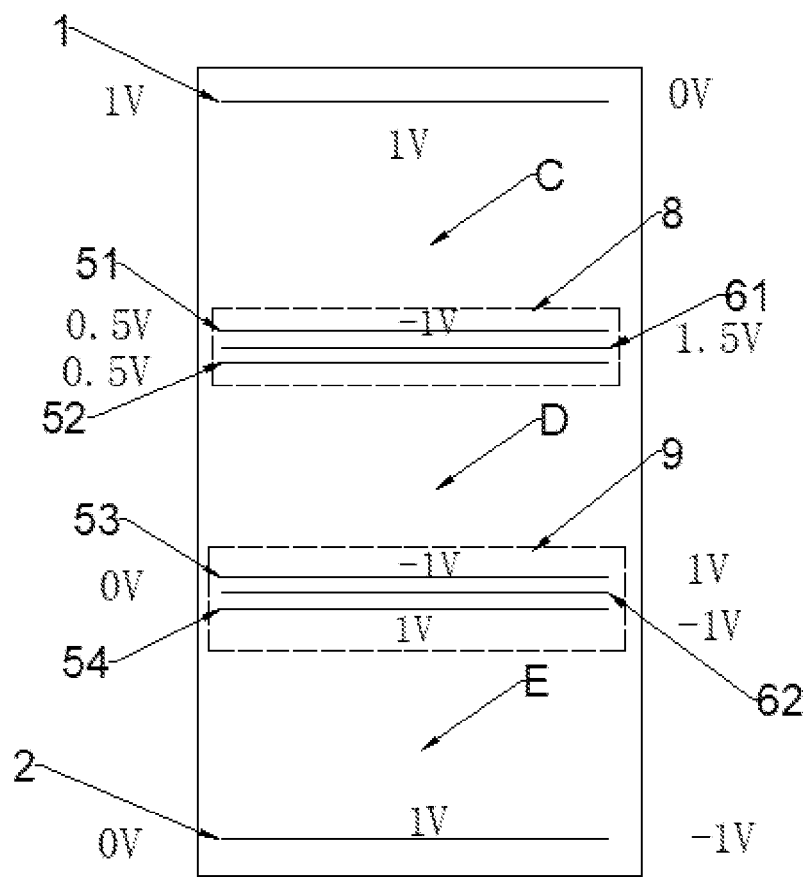
FIG. 7 shows the distribution of the plane projections from all bus bars on a first conductive layer and a second conductive layer and the distribution of voltage applied to bus bars, and also shows three partitioned color-changing regions C, E and D in Embodiment 3.

As shown in FIG. 7, the color-changing device includes a second partition structure 8 and a third partition structure 9, and the second partition structure 8 includes a first boundary bus bar 51 and a second boundary bus bar 52 that are located on the first conductive layer, and a first partition bus bar 61 that is located on the second conductive layer. The first partition bus bar 61 is located between the first boundary bus bar 51 and the second boundary bus bar 52. Region C and region D are separated out by the second partition structure 8, and region D and region E are separated out by the third partition structure 9.

The third partition structure 9 includes a third boundary bus bar 53 and a fourth boundary bus bar 54 that are located on the second conductive layer, and a second partition bus bar 62 on the first conductive layer; the second partition bus bar 62 is located between the third boundary bus bar 53 and the fourth boundary bus bar 54.

The projection of the first bus bar 1 coincides with the projection of the third bus bar 3 on the plane of the color-changing device, and the projection of the second bus bar 2 coincides with the projection of the fourth bus bar 4 on the plane of the color-changing device.

Each bus bar of the color-changing device is provided with lead-out structures and anchor holes at two ends, and the lead-out structures are staggered. At the same time, bus bars are not in contact with each other.

In the color-changing device, the second partition structure 8 has a width of 5 cm, and the third partition structure 9 has a width of 5 cm; the first, second, third and fourth bus bars have a width of 15 mm, and the first partition bus bar 61, the second partition bus bar 62, the third boundary bus bar 53 and the fourth boundary bus bar 54 have a width of 1 mm and a thickness of 5 µm.

It can be seen from FIG. 7 that the color-changing device is divided into three regions by the second partition structure 8 and the third partition structure 9, and the transmittance of the three regions can be adjusted by controlling the voltage applied on the bus bars, thereby allowing the whole device to realize the color-changing effect of partition color change and gradual color change.

Embodiment 4

This embodiment provides a control method for a color-changing device, and the control method can be performed by a controller that controls the transmittance of the color-changing device. Specifically, the method includes the following steps:

S1. A color-changing control signal is applied to the color-changing device, and target voltage is determined based on a transmittance state type carried by the color-changing control signal received by the color-changing device, in which the target voltage at least includes the respectively corresponding voltage values of a first bus bar, a second bus bar, a third bus bar, a fourth bus bar, a boundary bus bar and a partition bus bar:

S2. The transmittance state of the color-changing device is adjusted with the target voltage.

In the step S1, the color-changing control signal may be applied by the user discretionarily, or may be triggered by specific condition (such as temperature, illumination, etc.). The color-changing control signal at least carries a transmittance state type, and specifically, the transmittance state type includes partition color change, gradual color change, other type preset by the user, and the like. The color-changing control signal can be, for example, [partition color change], [gradual color change], and the like.

Furthermore, the color-changing control signal can also carry a location information of the color-changing region and a transmittance state corresponding to each location. Specifically, the color-changing device can be divided into a plurality of regions, and each region has its corresponding code. For example, for the color-changing device of Embodiment 3, the color-changing device can be divided into region C located above the second partition structure 8, region D located between the second partition structure 8 and the third partition structure 9, and region E located below the third partition structure 9. The color-changing control signal can be, for example, [partition color change: region C, bleached state: region D, colored state; region E, bleached state], [gradual color change: region C, colored state; region D, gradual-transition state from colored state to bleached state: region E, bleached state], and the like.

A target voltage list corresponding to different transmittance state types is pre-stored in the controller/processor of the color-changing device. When the transmittance state type of the color-changing device is determined, the voltage value corresponding to each bus bar can be determined based on the target voltage list. Then, the corresponding voltage is applied to each bus bar respectively, so that the transmittance state of the color-changing device can be adjusted to the desired state.

Taking the color-changing device of Embodiment 3 as an embodiment, an implementation process of the control method is specifically described below.

Exemplarily, target voltage list 2 is as follows.

TABLE 2

| Bus bar | Voltage code | Gradual color change |
|---|---|---|
| First bus bar 1 | U1 | 1 V |
| Second bus bar 2 | U2 | 0 V |
| First boundary bus bar 51 | U5 | 0.5 V |
| Second boundary bus bar 52 | U6 | 0.5 V |
| Third bus bar 3 | U3 | 0 V |
| Fourth bus bar 4 | U4 | −1 V |
| First partition bus bar 61 | U7 | 1.5 V |
| Second partition bus bar 62 | U8 | 0 V |
| Third boundary bus bar 53 | U9 | 1 V |
| Fourth boundary bus bar 54 | U10 | −1 V |

The following description may explain how the gradual color change is implemented.

For region C, U1–U3=1 V, U5–U7=–1 V: for region D, U6–U7=U8–U9=–1 V; for region E, U8–U10=U2–U4=1 V: the color-changing effect is realized, in which region C has a gradual-transition state from bleached state to colored state, region D has a colored state, and region E has a bleached state.

For the color-changing device of this embodiment, region E has a voltage difference of 1 V between the two conductive layers, and then the material of the color-changing layer will be bleached under this 1 V voltage, and the transmittance becomes higher (for example, the transmittance is increased to 60%), so that region E is visually transparent and colorless; region D has a voltage difference of –1 V between the two conductive layers, and then the material of the color-changing layer will be colored under this voltage, and the transmittance becomes lower (for example, the transmittance is reduced to 5%), so that region D is visually dark and opaque; region C has a voltage difference that transitions from 1 V to –1 V from top to bottom, so that region C visually shows the gradual color-changing effect from colored state to bleached state.

It can be understood that, when the whole device is expected to exhibit one certain state, such as bleached state, the effect can be realized by applying voltage at the two ends of the device (for example, voltage is applied to the first bus bar 1 and the fourth bus bar 4 to allow those two to have a voltage difference of 1 V); additionally, in the case where the whole device is expected to exhibit gradual color change, for example, the color-changing effect of the whole device from top to bottom transitioning from colored state to bleached state, the effect can be realized by applying voltage at the two ends of the device (for example, allowing U1–U3=–1 V, U2–U4=1 V).

It can be understood that the specific voltage values in this embodiment are specific embodiments given for the convenience of explaining the present application, and have no specific limitation on the voltage of each bus bar. Those skilled in the art can modify the voltage based on the invention conception of the present application.

It can be seen from Embodiment 2 and Embodiment 4 that the effects of partition color change and gradual color change are achieved at the same time in the present application with no need to separate the conductive layers completely, and thus the region showing partition color change can be adjusted according to the practical situation.

It can be understood that those skilled in the art can also separate the conductive layer between the two boundary bus bars in a partition structure of the present application (for example, by cutting off the conductive layer between the two boundary bus bars in a partition structure, and causing disconnect between the two boundary bus bars), and under this circumstance, the color change of the whole device cannot be adjusted by just applying voltage at the two ends of the device.

The applicant has stated that although the embodiments of the present application are described above, the protection scope of the present application is not limited thereto, but is defined by the claims.

What is claimed is:

1. A color-changing device, comprising a first substrate layer, a first conductive layer, a color-changing layer, a second conductive layer and a second substrate layer that are stacked in sequence; wherein
    the first conductive layer is provided with a first bus bar and a second bus bar respectively at edges of two ends;
    the second conductive layer is provided with a third bus bar and a fourth bus bar respectively at edges of two ends; and
    the color-changing device comprises at least one partition structure, wherein the partition structure comprises at least two boundary bus bars and at least one partition bus bar located between the two boundary bus bars, and the partition bus bar and the boundary bus bar are respectively located on different conductive layers.

2. The color-changing device according to claim 1, wherein the partition structure has a width of less than 5 cm.

3. The color-changing device according to claim 1, wherein the first conductive layer and the second conductive layer are both provided with an anchor hole.

4. The color-changing device according to claim 1, wherein the first bus bar, the second bus bar, the third bus bar, the fourth bus bar, the partition bus bar and the boundary bus bar are parallel to each other.

5. The color-changing device according to claim 1, wherein the projection of the first bus bar coincides with the projection of the third bus bar on the plane of the color-changing device, and/or the projection of the second bus bar coincides with the projection of the fourth bus bar on the plane of the color-changing device.

6. The color-changing device according to claim 1, wherein the first bus bar, the second bus bar, the third bus bar, the fourth bus bar, the partition bus bar and the boundary bus bar independently have a thickness of 10 nm-5 μm.

7. The color-changing device according to claim 1, wherein the first bus bar, the second bus bar, the third bus bar, the fourth bus bar, the partition bus bar and the boundary bus bar independently have a width of less than 20 mm, optionally less than 2 mm.

8. The color-changing device according to claim 1, wherein, the first bus bar, the second bus bar, the third bus bar, the fourth bus bar, the partition bus bar and the boundary bus bar all have electrical conductivity more than that of the first conductive layer and the second conductive layer.

9. The color-changing device according to claim 1, wherein, at least one end of the first bus bar, the second bus bar, the third bus bar, the fourth bus bar, the partition bus bar and the boundary bus bar are provided with a lead-out structure.

10. The color-changing device according to claim 1, wherein, the first bus bar, the second bus bar, the third bus bar, the fourth bus bar, the partition bus bar and the boundary bus bar are provided with a lead-out structure at two ends.

11. The color-changing device according to claim 9, wherein the lead-out structures of the first bus bar, the second bus bar, the third bus bar, the fourth bus bar, the partition bus bar and the boundary bus bar are staggered.

12. The color-changing device according to claim 1, wherein the first bus bar, the second bus bar, the third bus bar, the fourth bus bar, the partition bus bar and the boundary bus bar are not in contact with each other.

13. The color-changing device according to claim 1, wherein the first bus bar, the second bus bar, the third bus bar, the fourth bus bar, the partition bus bar and the boundary bus bar are independently provided with a protective layer and/or an insulating layer.

14. A control method for a color-changing device for controlling a transmittance state of a color-changing device, comprising:
    applying a color-changing control signal to the color-changing device, and the color-changing device comprises a first conductive layer and a second conductive layer; wherein the first conductive layer is provided with a first bus bar and a second bus bar respectively at edges of two ends; the second conductive layer is provided with a third bus bar and a fourth bus bar respectively at edges of two ends; and the color-changing device comprises at least one partition structure, wherein the partition structure comprises at least two boundary bus bars and at least one partition bus bar located between the two boundary bus bars, and the partition bus bar and the boundary bus bar are respectively located on different conductive layers, and determining a target voltage based on a transmittance state type carried by the color-changing control signal received by the color-changing device, wherein the target voltage at least comprises the respectively corresponding voltage values of the first bus bar, the second bus bar, the third bus bar, the fourth bus bar, the boundary bus bar and the partition bus bar;

adjusting the transmittance state of the color-changing device with the target voltage.

15. The control method for a color-changing device for controlling a transmittance state of a color-changing device according to claim 14,
wherein the transmittance state type includes partition color change, gradual color change and other type preset by the user.

16. The control method for a color-changing device for controlling a transmittance state of a color-changing device according to claim 14,
wherein the color-changing control signal carries location information of the color-changing region and a transmittance state corresponding to each location.

17. The control method for a color-changing device for controlling a transmittance state of a color-changing device according to claim 14,
wherein the color-changing control signal comprises partition color change, region A, bleached state, region B and colored state, or the color-changing control signal comprises gradual color change, region A, colored state, region B and gradual-transition state from colored state to bleached state.

18. The control method for a color-changing device for controlling a transmittance state of a color-changing device according to claim 14,
wherein the color-changing control signal comprises partition color change, region C, bleached state, region D, colored state, region E and bleached state, or the color-changing control signal comprises gradual color change, region C, colored state, region D, gradual-transition state from colored state to bleached state, region E and bleached state.

19. The control method for a color-changing device for controlling a transmittance state of a color-changing device according to claim 14, comprising:
pre-storing a target voltage list corresponding to different transmittance state types in a controller or processor of the color-changing device.

20. The control method for a color-changing device for controlling a transmittance state of a color-changing device according to claim 19, wherein the determining the target voltage comprises:
when the transmittance state type of the color-changing device is determined, determining the voltage value corresponding to each bus bar based on the target voltage list.

* * * * *